US012768999B2

(12) United States Patent
Denham

(10) Patent No.: US 12,768,999 B2
(45) Date of Patent: Oct. 20, 2026

(54) LIDAR SENSOR HISTOGRAM COMPUTATION

(71) Applicant: Continental Automotive Systems, Inc., Auburn Hills, MI (US)

(72) Inventor: Martin Spence Denham, Bend, OR (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 1329 days.

(21) Appl. No.: 17/303,407

(22) Filed: May 28, 2021

(65) Prior Publication Data

US 2022/0381918 A1 Dec. 1, 2022

(51) Int. Cl.

| | |
|---|---|
| ***G01S 17/894*** | (2020.01) |
| ***G01S 7/4863*** | (2020.01) |
| ***G01S 17/931*** | (2020.01) |

(52) U.S. Cl.

CPC .......... *G01S 17/894* (2020.01); *G01S 7/4863* (2013.01); *G01S 17/931* (2020.01)

(58) Field of Classification Search

CPC ........ G01S 17/10; G01S 17/90; G01S 17/894; G01S 17/931; G01S 7/487; G01S 7/4863; G01S 7/4865

See application file for complete search history.

(56) References Cited

U.S. PATENT DOCUMENTS 10,962,628 B1* 3/2021 Laifenfeld .............. G01S 7/487
2012/0075615 A1* 3/2012 Niclass ................. G01S 7/4816 356/5.01
2013/0300838 A1 11/2013 Borowski
2015/0071566 A1* 3/2015 Goodman ............. G01S 7/4863 382/279
2016/0139266 A1* 5/2016 Montoya ................. G01S 17/42 356/5.01
2017/0052065 A1 2/2017 Sharma et al.
2019/0056497 A1* 2/2019 Pacala .................... G01S 7/4863
2019/0250257 A1* 8/2019 Finkelstein .......... H04N 25/773
2020/0174120 A1 6/2020 Steigemann
2020/0233068 A1* 7/2020 Henderson ........... H04N 25/773
2020/0278429 A1* 9/2020 Mandai ...................... G01J 1/44
2021/0026013 A1* 1/2021 Beuschel .............. G01S 7/4863
2021/0124027 A1* 4/2021 Holzhüter ............... G01S 7/487
2021/0215807 A1* 7/2021 Henderson ............ G01S 7/4863

(Continued)

FOREIGN PATENT DOCUMENTS

WO WO-2016063028 A1 * 4/2016 ............. G01S 17/10

OTHER PUBLICATIONS

Zhang et al.; A CMOS SPAD Imager with Collision Detection and 128 Dynamically Reallocating TDCs for Single-Photon Counting and 3D Time-of-Flight Imaging. Sensors 2018, 18, 4016. https://doi.org/10.3390/s18114016.

(Continued)

*Primary Examiner* — Yuqing Xiao

(57) ABSTRACT

A method includes actuating a laser diode to emit a first series of laser pulses in a first frequency, enabling ap single-photon-avalanche diode (SPAD) in a pixel of a focal-plane array to detect a photon during a first series of enable times defined by a first series of enable pulses in a second frequency greater than the first frequency, and updating a histogram memory based on a photon detected during the first series of enable times.

12 Claims, 10 Drawing Sheets

(56) References Cited

U.S. PATENT DOCUMENTS

| | | | | |
|---|---|---|---|---|
| 2022/0035010 | A1* | 2/2022 | Caporale | G01S 7/4865 |
| 2022/0171036 | A1* | 6/2022 | Mellot | G01S 17/10 |

OTHER PUBLICATIONS

Rapp et al; "Dithered depth imaging"; Optics Express, vol. 28, No. 23; Nov. 9, 2020; pp. 35143-35157; https://doi.org/10.1364/OE.408800.

G. Buller et al. "Ranging and Three-Dimensional Imaging Using Time-Correlated Single-Photon Counting and Point-by-Point Acquisition", IEEE Journal of Selected Topics in Quantum Electronics, IEEE, USA, vol. 13, No. 4, Jul. 1, 2007, pp. 1006-1015, XP011191822, ISSN: 1077-260X, DOI: 10.1109/JSTQE.2007.902850 p. 1009-p. 1010.

International Search Report and Written Opinion dated Sep. 19, 2022 from corresponding International patent application No. PCT/US2022/072612.

* cited by examiner

LIDAR SENSOR HISTOGRAM COMPUTATION

BACKGROUND

A solid-state Lidar (Light Detection And Ranging) system includes a photodetector, or an array of photodetectors, that is fixed in place relative to a carrier, e.g., a vehicle. The term "solid-state" refers to the concept of the system not having moving components such as spinning mirrors or localized gimbal systems. Light is emitted into the field of view of the photodetector and the photodetector detects light that is reflected by an object in the field of view, conceptually modeled as a packet of photons. For example, a Flash Lidar system emits pulses of light, e.g., laser light, into the entire field of view. The detection of reflected light is used to generate a three-dimensional (3D) environmental map of the surrounding environment. The time of flight of reflected photons detected by the photodetector is used to determine the distance of the object that reflected the light.

The solid-state Lidar system may be mounted on a vehicle to detect objects in the environment surrounding the vehicle and to detect distances of those objects for environmental mapping. The output of the solid-state Lidar system may be used, for example, to autonomously or semi-autonomously control operation of the vehicle, e.g., propulsion, braking, steering, etc. Specifically, the system may be a component of or in communication with an advanced driver-assistance system (ADAS) of the vehicle.

A 3D map is generated is based on a histogram of time of flight of reflected photons. Difficulties can arise in providing sufficient memory for calculating and storing histograms of the time of flights.

DETAILED DESCRIPTION

Introduction

Figure 1:
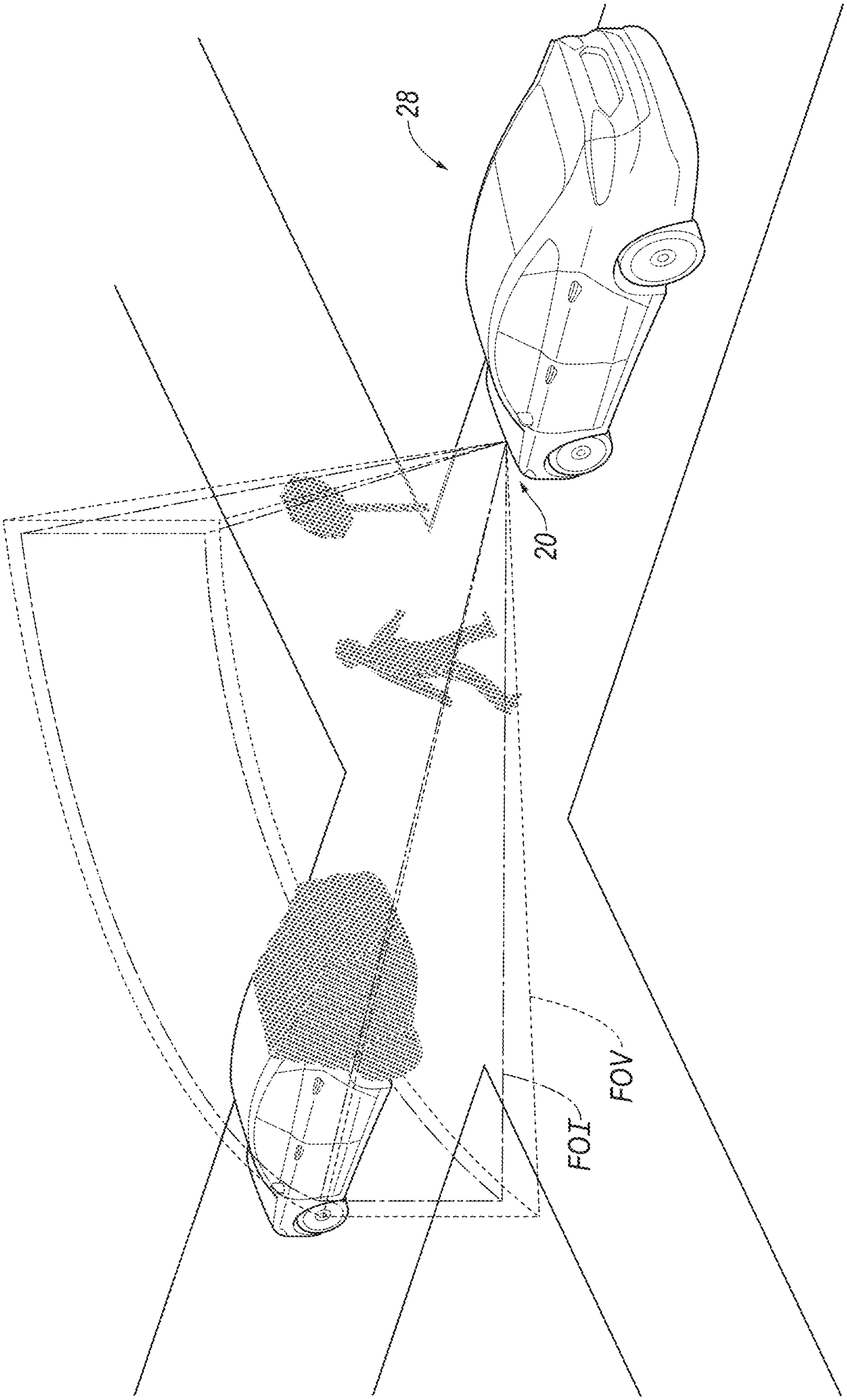
FIG. 1 is a perspective view of a vehicle having a lidar system.

FIG. 1 shows an example vehicle 28. The lidar system 20 is mounted to the vehicle 28. In such an example, the lidar system 20 is operated to detect objects in the environment surrounding the vehicle 28 and to detect distances of those objects for environmental mapping. The output of the lidar system 20 may be used, for example, to autonomously or semi-autonomously control the operation of the vehicle 28, e.g., propulsion, braking, steering, etc. Specifically, the lidar system 20 may be a component of or in communication with an advanced driver-assistance system (ADAS) 30 of the vehicle 28. The lidar system 20 may be mounted on the vehicle 28 in any suitable position and aimed in any suitable direction. As one example, the lidar system 20 is shown on the front of the vehicle 28 and directed forward. The vehicle 28 may have more than one lidar system 20 and/or the vehicle 28 may include other object detection systems, including other lidar systems 20. The vehicle 28 is shown in FIG. 1 as including a single lidar system 20 aimed in a forward direction merely as an example. The vehicle 28 shown in the Figures is a passenger automobile. As other examples, the vehicle 28 may be of any suitable manned or un-manned type including a plane, satellite, drone, watercraft, etc.

The lidar system 20 may be a solid-state lidar system 20. In such an example, the lidar system 20 is stationary relative to the vehicle 28. For example, the lidar system 20 may include a casing that is fixed relative to the vehicle 28, i.e., does not move relative to the component of the vehicle 28 to which the casing is attached, and internal electronic components of the lidar system 20 are supported by the casing.

As a solid-state lidar system, the lidar system 20 may be a flash lidar system. In such an example, the lidar system 20 emits pulses of light into the field of illumination FOI (FIG. 1). More specifically, the lidar system 20 may be a 3D flash lidar system 20 that generates a 3D environmental map of the surrounding environment, as shown in part in FIG. 1. An example of a compilation of the data into a 3D environmental map is shown in the FOV and the field of illumination (FOI) in FIG. 1. A 3D environmental map may include location coordinates of points within the FOV with respect to a coordinate system, e.g., a Cartesian coordinate system with an origin at a predetermined location such as a GPS (Global Positioning System) reference location, or a reference point within the vehicle 28, e.g., a point where a longitudinal axis and a lateral axis of the vehicle 28 intersect.

Figure 2:
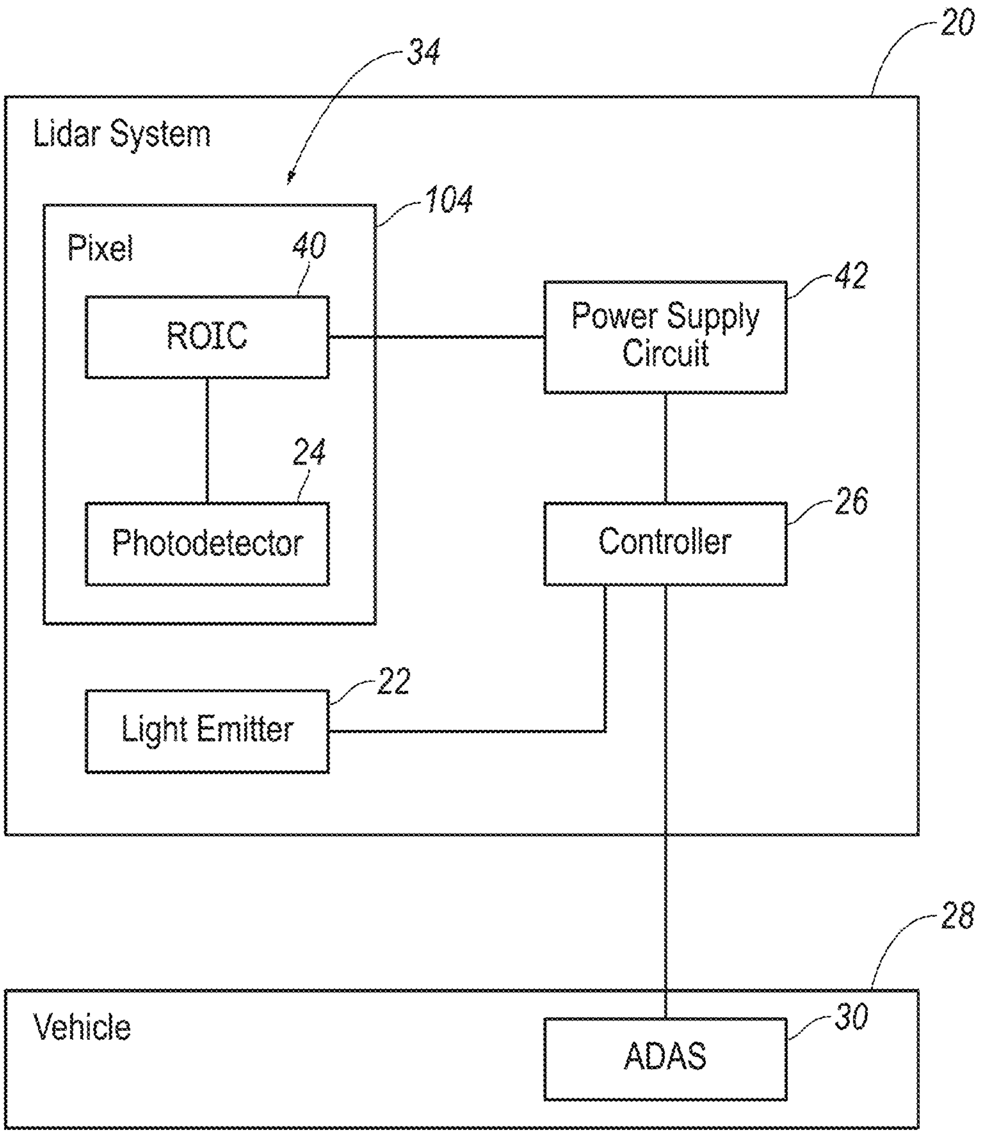
FIG. 2 is a perspective view of the lidar system.

With reference to FIG. 2, the lidar system 20 includes the light emitter 22 that emits shots, i.e., pulses, of light into the field of illumination FOI for detection by a light-receiving system 34 when the light is reflected by an object in the field of view FOV. The light-receiving system 34 has a field of view (hereinafter "FOV") that overlaps the field of illumination FOI and receives light reflected by surfaces of objects, buildings, road, etc., in the FOV. The light emitter 22 may be in electrical communication with a controller 26 of the lidar system 20, e.g., to provide the shots in response to commands from the controller 26.

The controller 26 may be configured to perform operations specified herein. The controller 26 may include a programmable processor and/or a dedicated electronic circuit including or embedded within an Application-Specific Integrated Circuit (ASIC) that is manufactured for a particular operation, e.g., an ASIC for determining gain control signal. In another example, a dedicated electronic circuit may include a Field-Programmable Gate Array (FPGA) which is an integrated circuit manufactured to be configurable by a customer. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging. Alternatively, parts of the controller may also be realized through "custom" design, wherein schematics are used to create the control function, instead of VHDL.

The controller 26 of the lidar system 20 may be a microprocessor-based controller implemented via circuits, chips, or other electronic components. The controller 26 is in electronic communication with the pixels 38 (e.g., with the ROIC 40 and power-supply circuits) and the vehicle 28 (e.g., with the ADAS 30) to receive data and transmit commands. The controller 26 may include a processor and a memory. The controller 26 may be configured to execute operations disclosed herein. Specifically, the memory stores instructions executable by the processor to execute the operations disclosed herein and electronically stores data and/or databases. electronically storing data and/or databases. The memory includes one or more forms of computer-readable media, and stores instructions executable by the controller 26 for performing various operations, including as disclosed herein, for example the method 900 shown in FIG. 9. For example, the controller 26 may include a dedicated electronic circuit including or embedded within an ASIC (Application Specific Integrated Circuit) that is manufactured for a particular operation, e.g., calculating a histogram of data received from the lidar system 20 and/or generating a 3D environmental map for a Field of View (FOV) of the vehicle 28. In another example, the controller 26 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging. It is also well understood to those skilled in the art of ASIC design that parts or all of the ASIC design implementation may also be created by using schematics as an alternative to VHDL-based implementation. The exact manner of the creation of the ASIC and the tools used does not obviate the novelty of the disclosure or alter the operations and methods herein. The controller 26 may be a set of computers communicating with one another via the communication network of the vehicle 28, e.g., a computer in the lidar system 20 and a second computer in another location in the vehicle 28.

Figure 3:
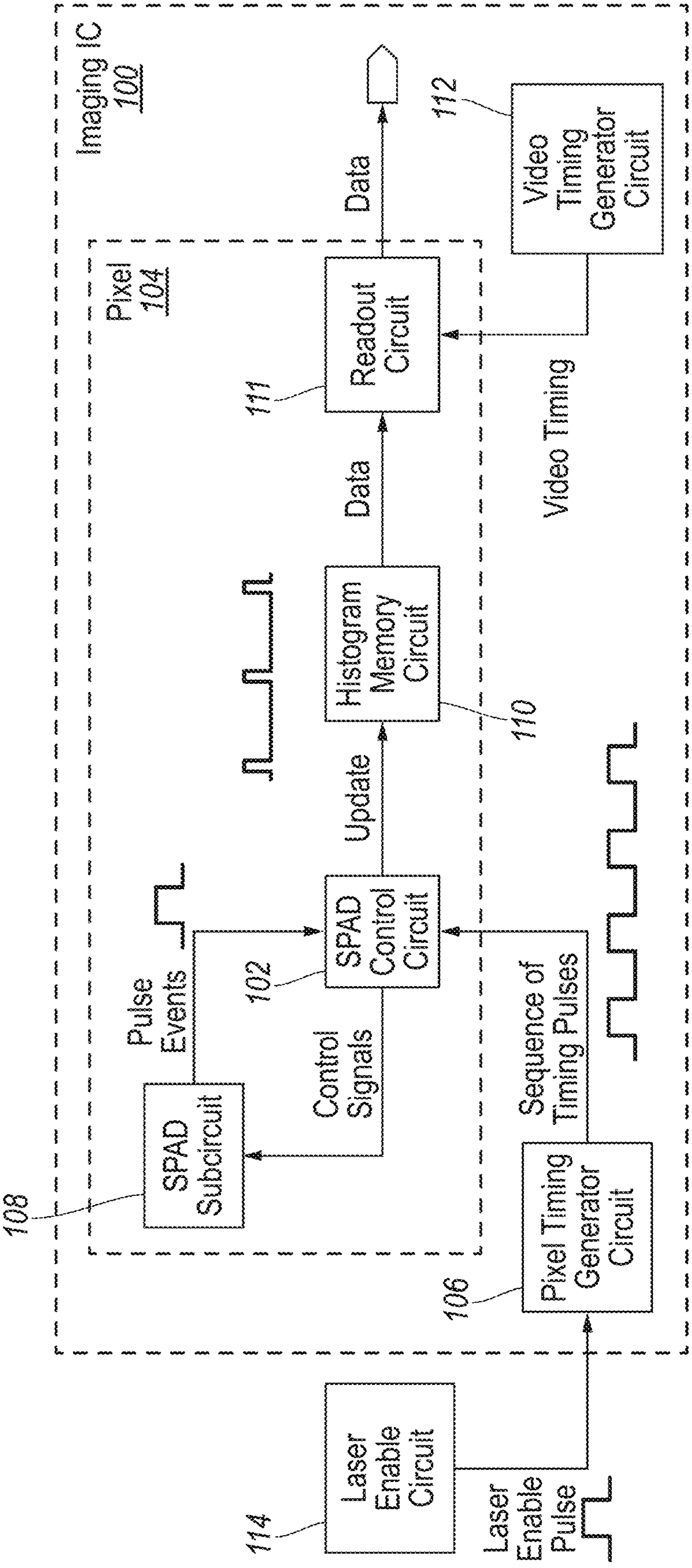
FIG. 3 is a block Diagram of an example imaging integrated circuit (IC).

The light emitter 22 may be a semiconductor light emitter, e.g., laser diodes. In one example, as shown in FIG. 3, the light emitter 22 may include a diode-pumped solid-state laser (DPSSL) emitter. In an example in which the light emitter 22 is a diode-pumped solid-state laser, the light emitter 22 may be an Nd:YAG laser. As another example, the light emitter 22 may be a fiber laser. As another example, the light emitter 22 may include a vertical-cavity surface-emitting laser (VCSEL) emitter. As another example, the light emitter 22 may include an edge emitting laser emitter. The light emitter 22 may be designed to emit a pulsed flash of light, e.g., a pulsed laser light. Specifically, the light emitter 22 is designed to emit a pulsed laser light.

The light-receiving system 34 detects light, e.g., emitted by the light emitter 22. The light-receiving system 34 includes a light detector, such as at least one photodetector 24. For example, the light detector may be a focal-plane array (FPA). The FPA can include an array of pixels 104. Each pixel 104 can include at least one photodetector 24 and a read-out integrated circuit (ROIC) 40. A power-supply circuit 42 may power the pixels 104. The FPA detects photons by photo-excitation of electric carriers, e.g., with the photodetectors 24. An output from the FPA indicates a detection of light and may be related to the amount of detected light. The outputs of FPA are collected to generate a 3D environmental map, e.g., 3D location coordinates of objects and surfaces within FOV of the lidar system 20. The FPA may include the photodetectors 24, e.g., that include semiconductor components for detecting reflections from the FOV of the lidar system 20.

Light emitted by the light emitter 22 may be reflected off an object back to the lidar system 20 and detected by the photodetectors 24. An optical signal strength of the returning light may be, at least in part, related exponentially to a time of flight/distance between the lidar system 20 and the object reflecting the light. The optical signal strength may be, for example, an amount of photons that are reflected back to the lidar system 20 from one of the shots of pulsed light. The greater the distance to the object reflecting the light/the greater the flight time of the light, the lower the strength of the optical return signal, e.g., for shots of pulsed light emitted at a common intensity. A time-of-flight determination and/or histogram may be used to generate the 3D environmental map.

The photodetectors 24 may be single photon avalanche diodes (SPADs), such as SPAD diode 116 in FIG. 4, arranged in one dimensional (1D), two-dimensional (2D) optical sensor integrated circuits and include ROICs 40 to measure ToF (Time of Flight) per pixel 104 of a momentary illumination, e.g., produced by a pulsed laser, reflected off objects in a field of view of the optical sensor.

Optical sensor ICs may be used in the ADAS 30 for constructing real-time and 3D awareness of objects in front of or in the periphery of a vehicle 28.

Such SPAD-based optical sensor ICs create opportunity and value to ADAS 30 and other applications in large part because they provide a path to progressively smaller pixels 104 and lower manufacturing cost. Smaller pixels 104 contribute to higher resolution image construction which in turn allows improvements in overall system performance. SPAD based optical sensors also create an opportunity to use high-density digital integrated circuit technology in that such diodes force a time to digital (TDC) conversion immediately in the signal chain. Alternatively, a histogram circuit which could comprise an SRAM with controlling logic could also be used instead of a TDC-based circuit for reconstructing the return signal from SPAD responses to multiple light emitter 22 pulses. Often, the histogram data can be processed by a matched filter processor to further improve the ToF measurement accuracy. The digital-only backend processing of ToF of SPAD receiver diodes creates compelling performance advantages for systems that use them. SPAD-based sensors also can extend the ToF range (i.e. distance to object) within the field of view in that they are sensitive to low return signals, ideally even a single reflected photon.

SPAD diodes in such sensors are typically electrically back-biased, often by 10 to 100 volts, which causes the diodes to form a depletion region wherein ideally no current flows. Such biasing is often referred to as reset or SPAD gating. The concept is that the SPAD diode is activated and ready to receive a photon which will avalanche and generate an electrical output pulse to a circuit which will determine ToF.

When such back-biased junctions are struck by an external photon, then the photon can cause an "avalanche" of hole-electron pairs to be generated, which in turn creates a pulse of current. The gain of this avalanche can be expressed as a number of hole-electron pairs divided by 1 (i.e. one photon), so the number of hole-electron pairs is essentially the gain. Such gains can range from a few hundred to several million.

Under operational conditions of the optical sensor, a light emitter 22 generates a light pulse in a wavelength of interest, and this pulse travels through media (space, air, water, or another fluid) and reflects off of objects of interest. A portion of the incident light pulse energy can be reflected by objects and return to a SPAD-based optical sensor that is related physically and electrically to the light emitter 22 which emitted the pulse. Often, light receiving system 34 includes an optical bandpass filter in series with receiving optics to attenuate out-of-band light to improve the selectivity of the receiving pixels to the wavelength of interest from light emitter 22. In such manner, designers of these systems work to improve the number of captured laser photons and reject unwanted photons. Note that these same filters will also attenuate a small percentage of returned laser energy.

SPAD-based sensors often use a histogram processor to construct a true return ToF to an object. In as much as SPAD diodes are sensitive to as little as a single photon, it makes such sensors vulnerable to stray light sources, including ambient solar radiation. Since the diodes are also semiconductor devices, they are susceptible to spontaneous Generation-Recombination (GR) events wherein thermally activated carriers spontaneously form in the back-biased depletion region of these diodes, and where such GR pairs can trigger an avalanche, which may be referred to as dark counts or dark current. (The term "dark" simply means not-generated by an external photon.) Thus, with the liability and possibility that avalanche diode effects can be triggered by objects that are not physical objects of interest in the field a view and whereas such events are somewhat random in time domain, those skilled in the art of SPAD sensor physics and design will often use a histogram processor, combined with a number of repeated laser shots to accumulate many ToF returns and then filter the histogram, looking for real objects of interest within the field of view (and filtering or eliminating random avalanche events).

If SPAD-based sensors were reset (per pixel 104) and triggered only once per laser firing, their range would be very limited, especially in environments having a high number of photons in the band (wavelength) of interest. Therefore, two SPAD circuit improvements come into play. First, in modern SPAD-based sensors, quench circuits and reset circuits restore each SPAD diode to a reset state, ready to receive another photon. Thus, within a single laser pulse measurement period, a single SPAD diode could receive a plurality of photon events and different points of time. The second effect is that in practical circuits, the ToF is commonly broken up into bins. Bins are intervals of time related to overall distance, and bins are the primary element of histograms. Thus, when a SPAD generates a pulse, it is related to a bin which is part of a histogram (i.e. a histogram bin). When a SPAD generates a pulse, a digital circuit stores the event often by incrementing a count value within a histogram bin. When a SPAD has triggered a pulse and that pulse is recorded in the histogram, the SPAD is quenched and reset, allowing it to trigger again, still within the same laser pulse period. Any further triggers will also be recorded in the histogram.

Histograms can be externally processed by a computer or other electrical device. As another example, histograms may be collocated on the sensor IC to improve power and performance. Histograms can be stored in a Random-Access Memory (RAM) or a Static Random-Access Memory (SRAM). SRAM memories require area and consume power; sometimes the power consumption is also leakage. SRAM dynamic power (the power associated with activity) and leakage power can increase the thermal loading of a sensor IC. If the number of pixels 104 is relatively large, then the amount of SRAM memory required to create the necessary histograms per pixel 104 can also be large and thus the area and power can also be large.

An increase of a die size of a SRAM memory increases increase the cost of a sensor IC and additionally an increased size of a memory die may adversely impact yield. In cases where one or more SRAMs may be associated with and collocated within a pixel 104 area, the size of the SRAM becomes of notable concern in optimization and may limit the smallest attainable size of a pixel 104. Shrinking pixel 104 dimensions is a desirable improvement because it reduces the size of a two dimensional pixel 104 array, allowing for reduction in cost and a shorter camera focal length for given f-number.

As a power consumption of an IC increases, the temperature of the die also increases. If the temperature increases, then the dark current or dark count will increase due to more thermally generated GR pairs, such dark count increasing possibly obscuring ToF for objects of interest in the field of view (i.e. reducing signal to noise [SNR]).

Thus, it is advantageous to reduce the die size and power of a sensor IC and is subsequently advantageous to reduce the size of RAM/SRAM.

Additionally, there is an interest in reducing an effect of ambient and dark counts associated with SPAD devices in pixels 104. A particular concern for ADAS sensors is that in order for the sensor to be truly useful for automotive applications, a sensor must be robust and operational against multiple adverse weather and environmental conditions. One operational condition that adversely impacts SPAD-based lidar receiving imagers (ROICs) is the reflection of sunlight at critical angles off of targets of interest in a field of view (FOV). It is desirable for the laser impulse to reflect off of a target in the FOV, and this is the signal that the SPAD imager is supposed to respond to. However, in-band (laser wavelength) photons are emitted by the sun at various power levels (fluxes) and not correlated to the impulse from the laser of a system, resulting in two deleterious effects. First, as solar photons impinge on the detector diodes of the system and cause avalanche events, the dead time of these events are regions where the desired signal cannot cause diode avalanches. Thus, as solar flux causes numerous dead time intervals per laser impulse, subsequently, the blocked regions that might have detected a target now appear to the system as signal attenuation. Second, the solar events do get recorded into the acquisition histogram of a pixel 104, thus elevating the conceptual noise floor (or noise "pedestal"). In this manner, thus attenuating the signal of interest and elevating the background counts in the histogram, the solar flux reduces signal to noise (SNR) of the system, and this, in turn, reduces operable detectable range of a target, making the sensor less useful under these worst case ambient conditions.

Herein a circuit and method are disclosed for reducing the size of RAM/SRAM that includes histogram memory. Additionally, the disclosed circuit may lead to improvements in range accuracy by better preserving the return impulse shape of a laser pulse return, allowing downstream digital processing to assess the center or peak of the return. The disclosed circuit may further contribute to improved signal-to-noise (SNR) of the return pulses by attenuating non-correlated ambient photons more than attenuating laser induced (signal) photons.

A SPAD control circuit 102 within each pixel 104 of an imaging IC 100 couples to a timing generator circuit 106 for a pixel 104 on the same imaging IC 100. The SPAD control circuit 102 also couples to one or more SPAD subcircuits 108 also located in or associated with the pixel 104. The SPAD control circuit 102 also couples to a histogram memory circuit 110 also located in or associated in some manner with the pixel 104. The controller 26 and the timing generator circuit 106 form at least part of a control system of the lidar system 20.

The pixel 104 timing generator circuit 106 of the imaging IC 100 couples to a laser enable circuit which could be on the same imaging IC 100 or could be located not on the imaging IC 100. The histogram memory circuit 110 couples to a readout circuit 111. The readout circuit can be coupled to other readout circuits in order to network and cause the transmission of data. A video timing generator circuit 112 couples to the readout circuit.

The laser enable circuit 114 transmits a laser enable pulse which can cause a laser such as light emitter 22 to fire. The laser enable pulse is also received by the pixel 104 timing generator circuit 106. In response to the laser enable pulse, the pixel 104 timing generator circuit 106 creates and transmits a sequence of timing pulses to the SPAD control circuit 102 of one or more pixels 104.

The sequence of timing pulses relate to locations in the histogram memory circuit. The sequence of timing pulses have two important properties. A first property is that the phase of the sequence of timing pulses can be varied relative to the laser enable pulse, creating a time offset relative to the laser enable pulse. A second property is the time offset can relate to an integer fraction of the period of the sequence of timing pulses.

Upon receipt of the sequence of timing pulses, the SPAD control circuit 102 causes multiple coordinated actions. A first coordinated action is that the SPAD control circuits 102 realizes a sequence of aperture times in which the SPAD control circuit 102 is sensitive to Pulse Events by one or more SPAD subcircuits 108. Another coordinated action is that the SPAD control circuit 102 in some embodiments can control the enablement of the same one or more SPAD subcircuits 108. Another coordinated action is that the SPAD control circuit 102 can cause bins of the histogram memory circuit to increment as follows: the bins of the histogram memory circuit that increment relate one-to-one with specific pulses within the sequence of timing pulses from the pixel 104 timing generator circuit 106.

The aperture times have two specified properties: A first specific property is that the aperture times are time intervals having a width that is smaller than the period of the sequence of timing pulses, a second property is that the aperture times create effective apertures that relate to an integer fraction of the period of the timing pulses.

In an example embodiment, the pixel 104 timing generator circuit 106 will set the phase of the sequence of timing pulses to a specific value for a specific number of laser enable pulses. After the specific number of laser enable pulses, the timing generator 106 of the pixel 104 allows a video timing generator circuit 112 to send video timing to the readout circuit of pixels 104, allowing the readout circuits to read data out of the histogram memory circuit 110. The histogram memory circuit 110 zeros (resets) bin values during readout. After video readout, the pixel 104 timing generator circuit 106 can change the phase of the sequence of timing pulses. The pixel 104 timing generator circuit 106 can modify the phases of the sequence of timing pulses by an algorithm that relates to allowing each fractional interval of the period of the sequence of timing pulses to be sensitive to pulse events of the SPAD subcircuit 108.

In another example embodiment, the histogram memory circuit has two banks of memory, allowing acquiring data and transmitting data simultaneously. Thus, the laser enable circuit and pixel 104 timing generator circuit 106 may not need to pause for the actions of the video timing generator circuit.

Example Embodiment

With reference to the Figures, wherein like numerals indicate like parts throughout the several views, a method includes actuating a light emitter 22, e.g., a laser diode, to emit a first series of laser pulses in a first frequency, enabling a single-photon-avalanche diode (SPAD) in a pixel 104 of a focal-plane array to detect a photon during a first series of enable times defined by a first series of enable pulses in a second frequency greater than the first frequency, and updating a histogram memory based on a photon detected during the first series of enable times.

FIG. 1 illustrates a block diagram of an example imaging integrated circuit (IC) 100.

SPAD control circuit 102 within each pixel 104 of an imaging IC 100 couples to a pixel timing generator circuit 106 on the same imaging IC 100. An imaging IC 100 may include a one or two dimensional array of pixels 104, along with supporting circuitry such as bias circuitry, IO circuitry, control and test circuitry, IO (Input Output) pads, and IO drivers and receivers. In one example, the imaging IC 100 may include only a single pixel 104, such pixel 104 possibly having a plurality of SPAD devices or SPAD subcircuits 108. A "subcircuit," herein, is a portion of a circuit included in the imaging IC 100.

Figure 4A:
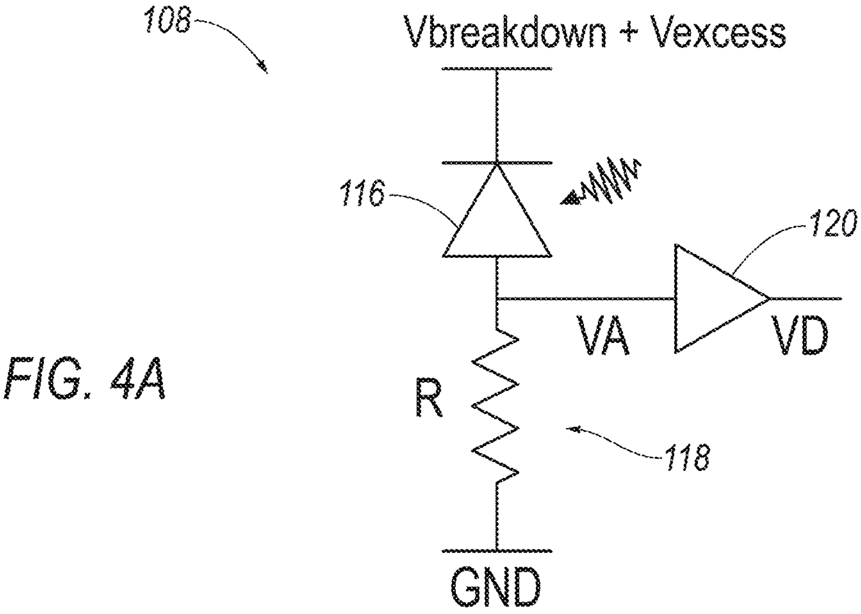
FIG. 4A is a Passively Quenched Single Photon Avalanche Diode (SPAD) circuit.
Figure 4B:
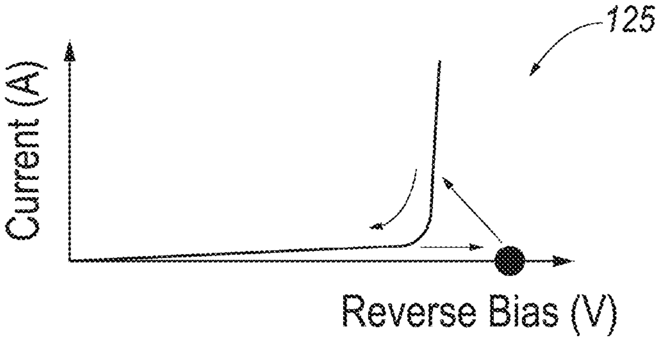
FIG. 4B is current versus voltage graph of the SPAD circuit of FIG. 4A.
Figure 4C:
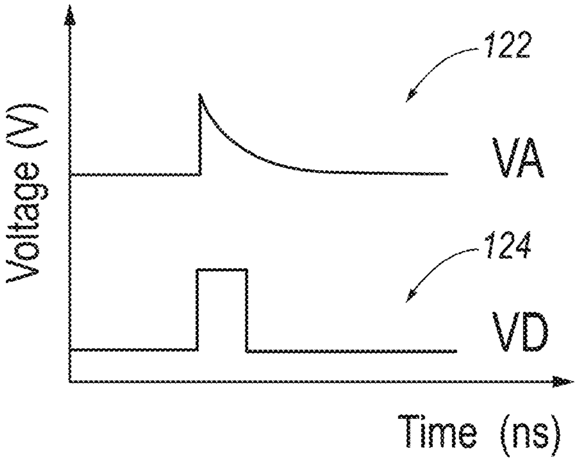
FIG. 4C is a voltage graph of the SPAD circuit of FIG. 4A.

The SPAD control circuit 102 couples to one or more SPAD subcircuits 108 also located in or associated with the pixel 104. A SPAD device is a diode, configured and used as a detector for light waves most typically in the visible spectrum or in the near infrared or shortwave infrared spectrums. A typical SPAD configuration has a quench circuit which might be as simple as a single device, a resistor. The SPAD device, coupled to its support quench circuit can be referred to as a SPAD subcircuit 108. FIG. 4A illustrates a single SPAD subcircuit 108 and its associated signals. SPAD diode 116 has its cathode coupled to a high potential ($V_{breakdown}+V_{excess}$) and its anode coupled to resistor 118 and interpreting buffer gate 120. FIG. 4B with graph 126 illustrates the essentially useful part of SPAD voltage/current behavior. Graph 125 shows the idealized response of a SPAD diode under DC (very low frequency) conditions. As a SPAD diode reverse bias voltage increases, avalanche current begins to flow as shown in the graph at about the breakdown voltage ($V_{breakdown}$). A quench resistor load line (not shown) would of course limit the current at the resistor load intercept point. A typical quench resistor is very high valued—thus intercepting the breakdown curve (of current) near the breakdown voltage. The usefulness of a SPAD however, is in its transient response. A SPAD diode is biased well above the reverse breakdown voltage shown in graph 125. Within a short period of time a photon or dark carrier event will happen (not imaging), or in TOF imaging, a laser return photon will strike the junction. Upon receipt of a critical photon, the SPAD diode 116 avalanches, causing a net potential at VA to behave as shown in a graph 122 of FIG. 4C. Buffer gate 120 interprets the high potential on VA, creating a digital potential VD, as shown in a graph 124 of FIG. 4C. After avalanching, net potential VA relaxes back to a quiescent potential after a period of time referred to as "dead time". Such a SPAD subcircuit 108 could be referred to as a passively quenched SPAD. This example SPAD subcircuit 108 serves to illustrate essential components of a SPAD subcircuit 108.

With continued reference to FIG. 1, the SPAD control circuit 102 also couples to a histogram memory circuit 110 also located in or associated in some manner with the pixel 104. The nature of the signals and wires that couple the SPAD control circuit 102 and histogram memory circuit 110 are such that the SPAD control circuit 102 can cause the histogram memory circuit 110 to increment a count value in a specific bin in conjunction with a SPAD subcircuit 108 Pulse Event. In some embodiments, the histogram memory circuit 110 can also respond to the sequence of Timing Signals independent of the SPAD control circuit 102, thus auto-indexing through its bins and only requiring a "Yes/No" logic signal from the SPAD control circuit 102 to determine whether or not to increment a count value in a given bin. In other embodiments, the SPAD control circuit 102 may directly determine which bin is incremented.

The pixel timing generator circuit 106 of the imaging IC 100 couples to a laser enable circuit 114 which could be included in the imaging IC 100 or could be located not on the imaging IC 100. For example, an FPGA, SoC, CPU, or similar sequencer device may include the laser enable circuit 114. However, it could be advantageous that the imaging IC 100 includes the laser enable circuit 114, e.g., for cost reduction or system simplification reasons.

Figure 7:
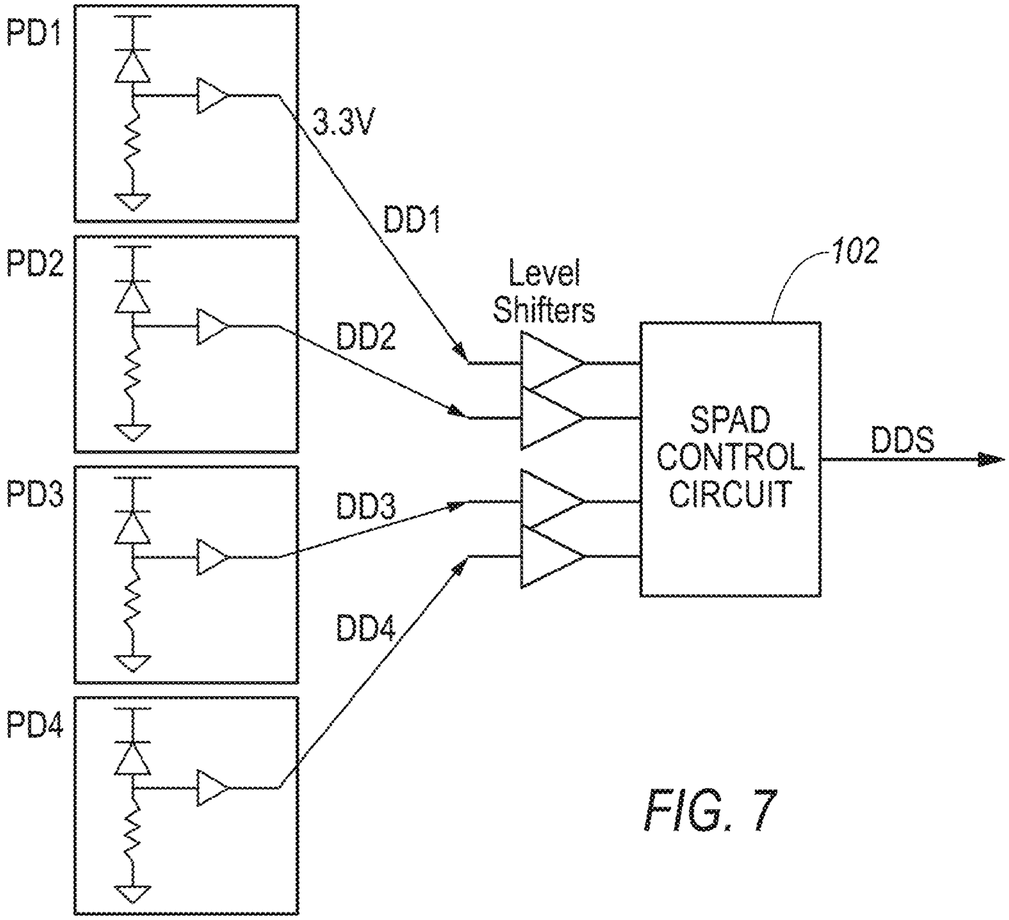
FIG. 7 shows an example block diagram of multiple SPAD pixel.
Figure 8:
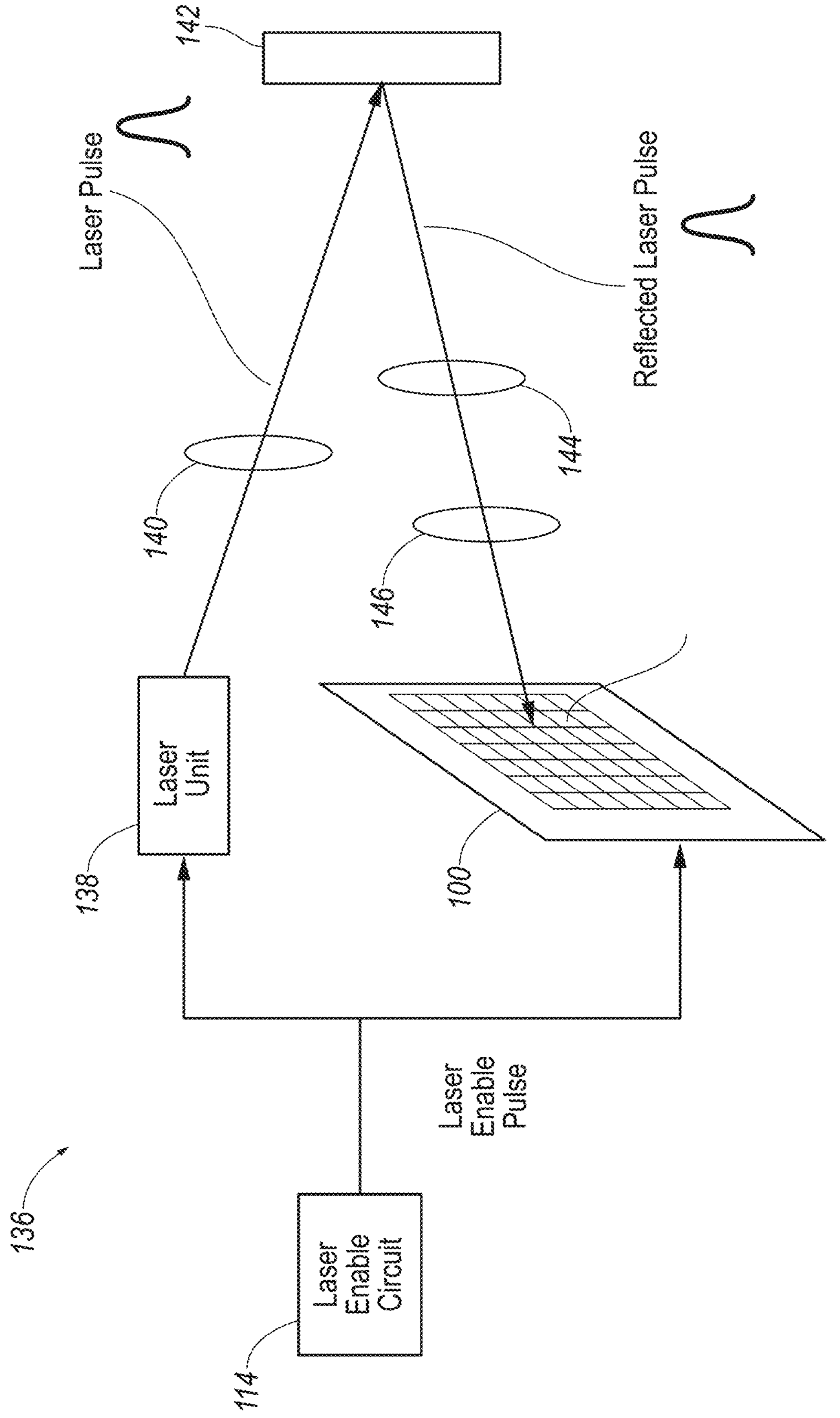
FIG. 8 shows an example system including an SPAD lidar sensor.
Figure 9:
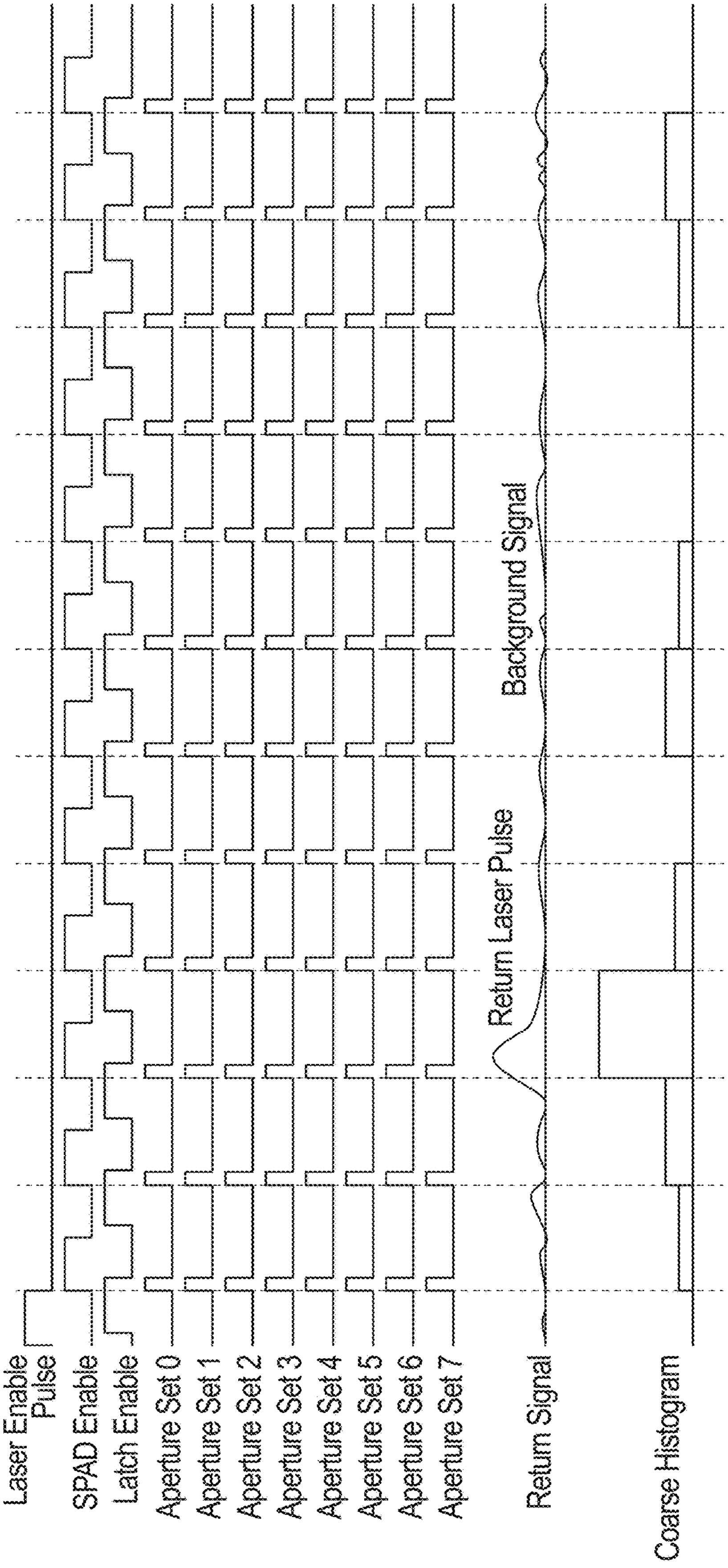
FIG. 9 shows an example graph of timing pulses for one set of pulses for a given phase offset.

The histogram memory circuit 110 couples to a readout circuit 111. At regular intervals, after acquiring a number of laser shots (caused by the Laser Enable Signals), the contents of the histogram memory circuit 110 is output to a "host" circuit which could be an FPGA, CPU, SoC, microcontroller, ASIC, or any number of devices or circuits. With reference to FIGS. 7-9, an overlay of several of these readouts creates a fine-grained histogram used for object detection.

The readout circuit 111 can be coupled to other readout circuits 111 in order to network and cause the transmission of data. A video timing generator circuit 112 couples to the readout circuit 111. Each pixel 104 has a readout circuit 111 which may include a tristate driver, a shift register, a wire-OR network, a daisy-chain gate network, and/or other such circuits. Subject to timing signals from the video timing generator circuit 112, each readout circuit 111 of a pixel 104 responds to pull data from the histogram memory circuit 110 and output (transmit) that data to a common output IO link, allowing the data to be transmitted to another circuit for further processing, e.g., determining an object location.

Figure 5A:
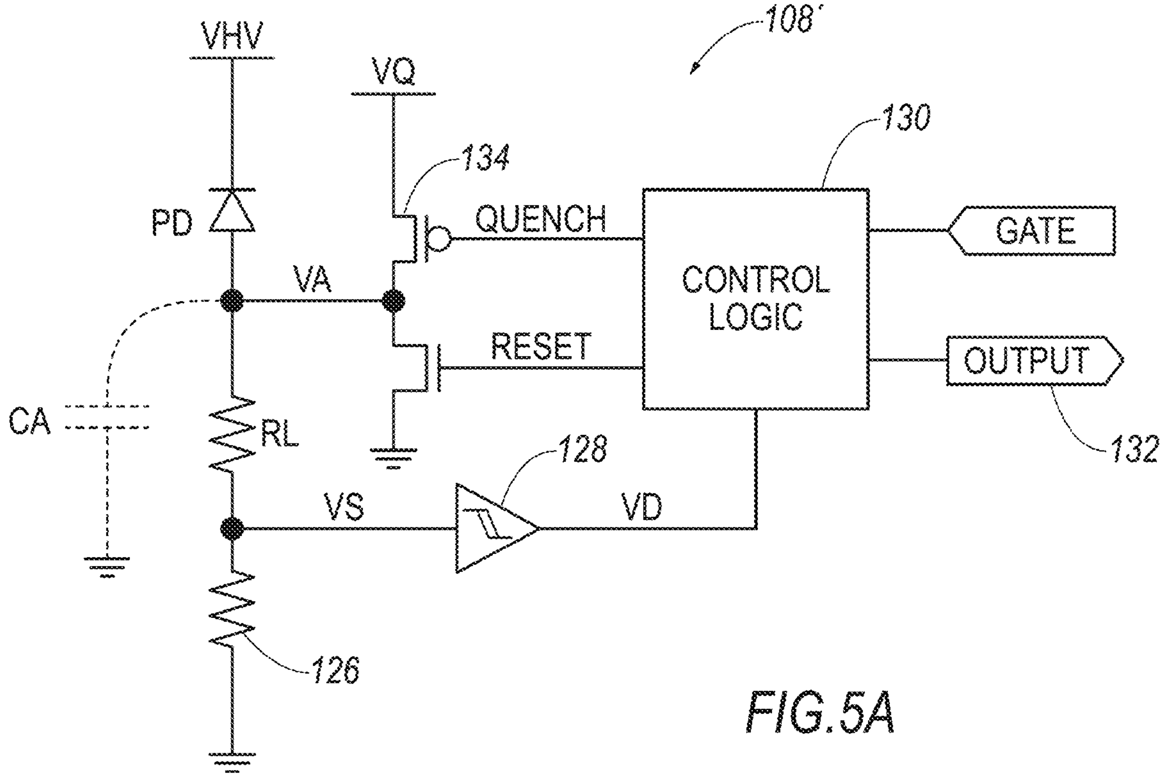
FIG. 5A shows an example block diagram of an actively quenched, actively reset SPAD circuit.
Figure 5B:
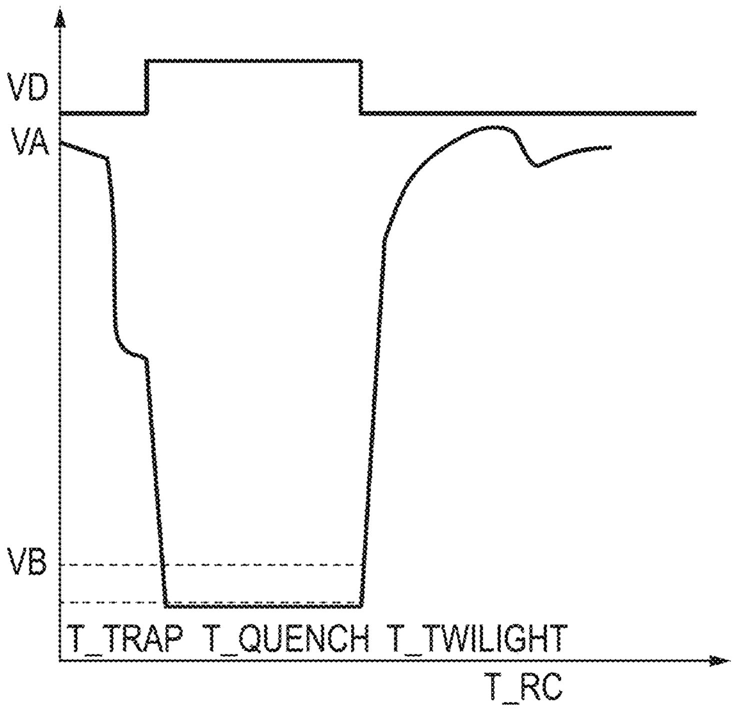
FIG. 5B shows example graphs of signals of the circuit of FIG. 5A.

FIG. 5A shows an example block diagram of an actively quenched, actively reset SPAD subcircuit 108'. The RESET signal initiates operation by pulling net potential VA down to a low potential, then RESET releases (returns to a quiescent state). When an avalanche occurs, the avalanche current across resistor 126 elevates net potential VS, causing buffer 128 to interpret this as a high (or active) state, generating net potential VD, going to a control logic 130. FIG. 3B shows example graphs of potentials VA and VD of the SPAD subcircuit 108' of FIG. 3A. The CONTROL LOGIC 130 can output a '1' state at the OUTPUT 132 and cause net potential QUENCH to go to a logic low state, activating a PFET device 134, causing net potential VA to be pulled to an elevated potential—active quenching. After a period of time created by the CONTROL LOGIC 130, a duration of time to allow carriers to leave the SPAD junction, the CONTROL LOGIC 130 can release net potential QUENCH back to its quiescent high state and active RESET to a high state, re-initiating the whole cycle again. The block diagram of FIG. 5A shows a SPAD subcircuit 108 embodiment that works effectively with the invention to improve efficiency of histogram data collection. It will be obvious to those skilled in the art of SPAD-based imager design that the exact implementation of an actively quenched SPAD subcircuit 108 as shown in FIG. 5A can have a variety of detailed changes to the schematic; however such changes do not obviate the claims of the invention.

Figure 6:
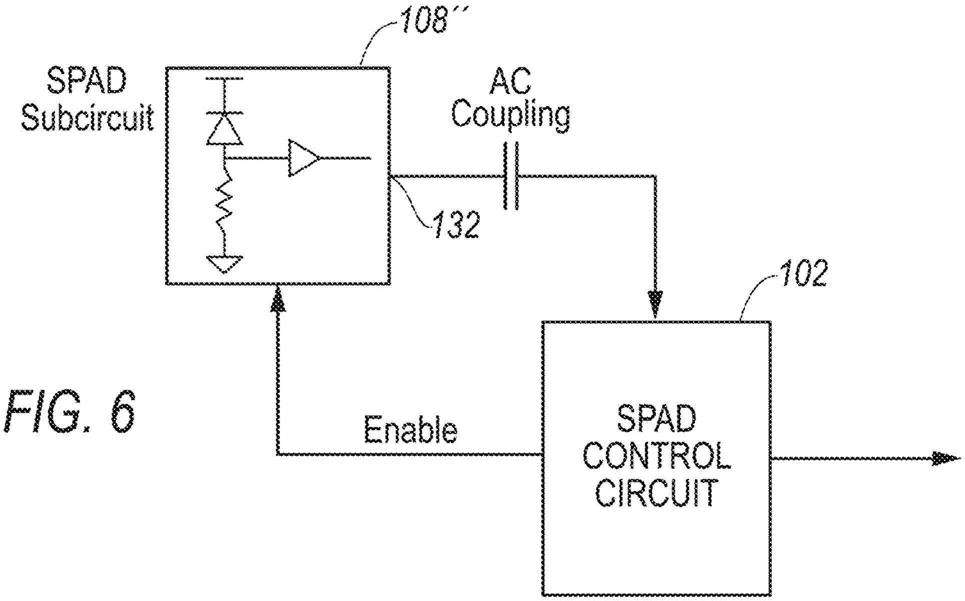
FIG. 6 shows an example block diagram of an AC Coupled SPAD circuit with an Enable input.

FIG. 6 illustrates yet another embodiment of a SPAD subcircuit 108" (details of the SPAD subcircuit devices are not shown). An output 132 of the SPAD subcircuit 108" is AC coupled to the SPAD control circuit 102, allowing only a pulse to appear to the input of the SPAD control circuit 102. The SPAD control circuit 102, in turn, provides an enable signal to the SPAD subcircuit 108", allowing it to be in operational state (i.e. correctly excess biased), i.e., ready for an avalanche. In this manner, an AC coupled SPAD subcircuit 108 can be made to work with the invention.

FIG. 7 is a block diagram illustrating an example, herein referred to as multiple SPAD aggregation, for aggregating multiple SPAD subcircuits 108, in which a plurality of SPAD subcircuits 108 are coupled to the SPAD control circuit 102. FIG. 7 also introduces SPAD subcircuit 108 variations. The SPAD circuits 108 of FIG. 7, labeled PD1-PD4 can be passively quenched, actively quenched, AC coupled, and so forth; in short, they can be of any number of detailed implementations. What is of specific interest and use to the invention is that PD1-PD4 output a pulse or a level on corresponding signals DD1-DD4, in response to a SPAD avalanche event, and that pulse or level can be received by SPAD control circuit 102 to denote the receipt of a photon. FIG. 7 also shows that in some embodiments, a voltage domain crossing is useful, and in that regard level shifters may be required in some embodiments. In an illustrative example, the SPAD output signals DD1-DD4 might be 3.3V signals; however, it could be advantageous for reasons of density or power for the SPAD control circuit to operate at 1.1V (using thin-gate CMOS devices, for example). In multiple SPAD aggregation, the SPAD control circuit 102 is modified in two respects. First, the interpretation of the meaning of the number of SPAD subcircuits 108 that are in an active state is defined by any number of algorithms within purview of the SPAD control circuit 102, and the number of active SPAD subcircuits 108 during any aperture is interpreted and presented to the histogram memory circuit 110.

Thus, the SPAD control circuit 102 can interpret several simultaneously active SPAD subcircuits 108 as a "hit" and cause the histogram memory circuit 110 to increment. The manner of combining the signals is flexible and could be a simple majority, a specific threshold, etc. The signals could be combined as multiple levels or perhaps events (leading edges for example) within a window of time. All such combinations are relevant to the invention, and the exact SPAD aggregation used does not obviate the claims of the invention.

FIG. 8 shows a SPAD lidar System 136. The laser enable circuit 114 outputs a laser enable pulse with a first frequency which can cause a laser to fire. The laser enable circuit 114 may transmit a laser enable pulse to a laser unit 138 and the imaging IC 100. More specifically, the laser enable circuit sends a laser enable pulse to the pixel timing generator circuit 106 of the imaging IC 100 as described above. The laser enable pulse causes a laser diode in the laser unit 138 to emit a laser pulse. The laser pulse can travel through a diffuser 140 to control distribution of the laser pulse energy. A diffuser is also sometimes referred to as a Diffractive Optical Element (DOE) and it comprises an array pattern of diffractive elements. The central purpose of the diffuser is to as-uniformly-as-possible spread laser light over a reasonably wide FOV to momentarily illuminate objects in the FOV. Some of the laser pulse energy is reflected off an object 142 in the field of view (FoV) and returns to the imaging IC 100 as a reflected laser pulse. Typically, the laser pulse would travel through an optical filter 144 and a lens 146 before impinging on the array of pixels 104 of the imaging IC 100.

The laser enable pulse is also received by the pixel timing generator circuit 106. The laser enable pulse is used by the pixel timing generator circuit 106 to establish a "time-0" reference with respect to image acquisition. In an example embodiment, the laser enable circuit 114 may create a number of laser enable pulses for a given Frame of data. A typical number of laser enable pulses for a given Frame could be between 500 and 2500 laser enable pulses. A typical duration of a frame of data could be 30 milliseconds. The importance of establishing time-0 is that it creates a timing reference framework for recording SPAD events in a histogram.

In response to the laser enable pulse, the pixel timing generator circuit 106 creates and transmits a sequence of timing pulses at a second frequency to the SPAD control circuit 102 of one or more pixels 104; the second frequency is higher than the first frequency and corresponds to windows of time represented by histogram bins. FIG. 9 shows an example timing of the sequence of timing pulses created by the SPAD control circuit 102 of a pixel 104, The laser enable pulse, a set (or series) of SPAD Enable pulses, and a set (or series) of Latch Enable pulses. In response to the SPAD enable pulses and the latch enable pulses, the logical overlap can produce a set of apertures, in phase with those signals.

The aperture times have two specific properties valued by the invention. A first property is that the aperture times are time intervals having a width that is smaller than the period of the sequence of timing pulses. A second property is that the aperture times create effective apertures that relate to an integer fraction of the period of the timing pulses. These apertures have this fundamental set of operational principles. In this manner, correlated events, such as returned laser pulses are fixed with reference to time-0 of the laser unit (i.e. relative to the laser enable pulse). In contrast, background events (background noise) is not correlated. When the apertures are smaller than the period of the sequence of timing pulses, random background signals are attenuated accordingly. In this manner, the sequence of timing pulses being realized as apertures with these properties, can improve signal to noise ratio, thus extending the working range of the lidar unit.

Figure 10:
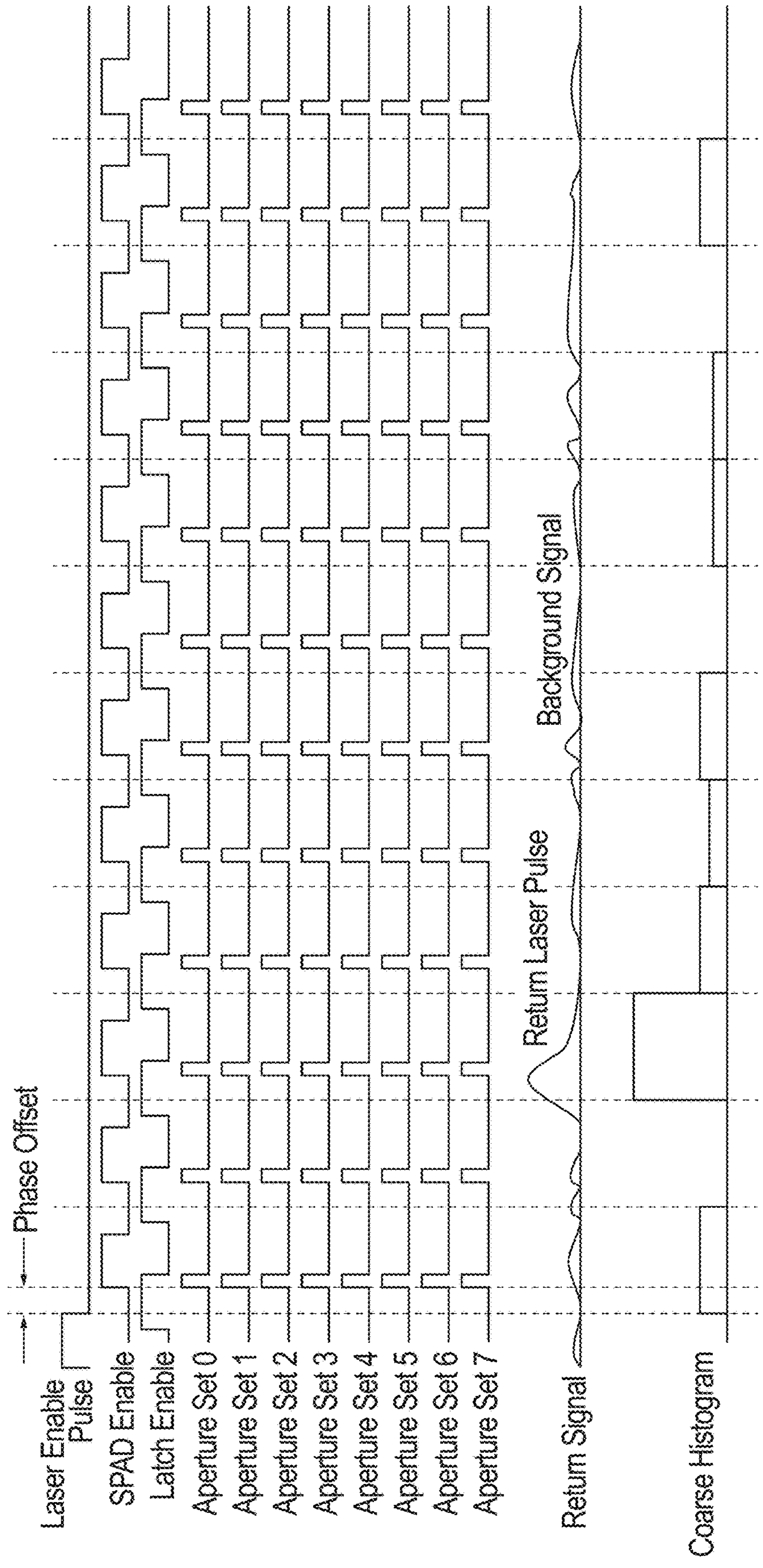
FIG. 10 shows an example graph of a sequence of timing pulses with Phase Offset.

FIG. 10 shows sets of aperture pulses corresponding to, e.g., 8 times, that the laser is fired (a sequence of 8 laser enable pulses). In this case, 8 is an example—the number of laser firings could be any number, e.g., 32, 128, etc. The example uses 8 to improve legibility of the illustration. The return signal graph in FIG. 10 is only one of the 8 returns that would be expected. Furthermore, in the laser return, the signal adjacent to but not overlapping with the return laser pulse would be different with each laser shot—the background signal has an average power density. Also it should be noted in FIG. 10 that because of low quantum efficiencies (QE's) of SPAD diodes that at times, even though there is a background signal, the SPAD might not record that signal on a given laser firing.

Further, as shown in FIG. 10, a return signal (of one laser firing) is represented, showing the return laser pulse and background signal caused by multiple noise sources, e.g., solar in-band flux may represent a worst-case condition of ambient noise. A laser diode, e.g., included in the laser unit 138, may be actuated to emit a second series of laser enable pulses in the first frequency, at a first time offset, as shown in FIG. 8, enabling the SPAD to detect a photon during a second series of enable times defined by a second series of enable pulses in the second frequency; and updating the histogram memory circuit 110 based on a photon detected during the second series of enable times.

The laser enable pulse initiates the sequence of timing pulses. With continuous reference to FIG. 8, the sequence of timing pulses includes two sets of correlated pulses, SPAD enable and latch enable. SPAD enable and latch enable are out of phase with respect to each other, however, they are of the same period and duty cycle, respectively.

The laser unit 134 may be actuated to emit a third series of laser pulses (non-overlapping with the second series of laser pulses) in the first frequency, and at a second time offset, enabling the SPAD to detect a photon during a third series of enable times defined by a third series of enable pulses in the second frequency. Thus, the SPAD control circuit 102 of each pixel 104 can use the logical combination of the two timing pulses of the sequence of timing pulses to synthesize or "realize" a set of apertures (an aperture being a time window). The apertures can be virtual. SPAD enable could allow a SPAD to be operational, that is, to be able to avalanche and latch enable can allow a latch to "see" an avalanche. In this manner, a latch in the SPAD control circuit 102 could capture an event if an avalanche occurs. Alternatively, the latch could be an RS latch (a Reset-Set Latch). In another embodiment, the latch could be replaced with a flipflop wherein the SPAD enable signal can asynchronously clear the flipflop when it is logic '1' (one) and not clear it with logic '0' (zero). The SPAD subcircuit 108 pulse events signal could be the clock on the flipflop and the data input of the flipflop could be a logic '1'. In this manner, a SPAD subcircuit 108 pulse event uses its edge to change the state of the flipflop to logic '1'. In these embodiments, there is no physical aperture signal per se; it is inferred from the timing. In other embodiments, however, such a signal could be realized if there were an advantage to doing so. Regardless of how the logic is actually realized, the invention claims this technique of creating these apertures.

The sequence of timing pulses relate to locations in the histogram memory circuit 110. The repeated set of laser enable pulses and the synthesized or "realized" sets of apertures have a 1:1 relationship with bins in the histogram memory circuit 110. For example, a plurality of time offsets may be determined, and at each of the plurality of time offsets, the SPAD subcircuit 108 may be enabled to detect a photon during a second series of enable times defined by a second series of enable pulses in the second frequency. The plurality of second series of enable pulses may cover a clock period of the first series of laser pulses.

A notional set of histogram memory circuit values are shown as coarse histogram. The coarse histogram can be realized in the imaging IC 100 as some variation of SRAM circuitry.

It is an advantage of the invention that the required SRAM physical dimensions can be much smaller than the effective final histogram that is able to be constructed on a host CPU or other processor. In this manner, the implementation characteristics of the invention act to reduce the overall size of SRAM on imaging IC 100, relative to prior art.

The sequence of timing pulses have two properties. A first property is that the phase offset of the sequence of timing pulses can be varied relative to the laser enable pulse, creating a time offset relative to the laser enable pulse. FIG. 10 is the same conceptual figure as FIG. 9; however, the phase offset between the sequence of timing pulses relative to the laser enable pulse has been changed. The sample coarse histogram also shows the conceptual change. The pixel 104 timing generator circuit 106 can change the phase offset of the sequence of timing pulses to allow the SPAD control circuit 102 of each pixel 104 to "explore" different regions of the incoming return signal which can include the reflected laser pulse signal.

A second property is the phase offset can relate to an integer fraction of the period of the sequence of timing pulses. The importance of the phase offset being an integer fraction of the period is that the related apertures reduce the level of ambient or background signal by that same integer fraction and can lead to improvements in signal to noise ratio.

Upon receipt of the sequence of timing pulses, the SPAD control circuit 102 causes multiple coordinated actions. A first coordinated action is that the SPAD control circuits 102 realizes a sequence of aperture times in which the SPAD control circuit 102 is sensitive to pulse events by one or more SPAD subcircuits 108. Another coordinated action is that the SPAD control circuit 102 in some embodiments can control the enablement of the same one or more SPAD subcircuits 108. Another coordinated action is that the SPAD control circuit 102 can cause bins of the histogram memory circuit 110 to increment as follows: the bins of the histogram memory circuit 110 that increment relate one-to-one with specific pulses within the sequence of timing pulses from the pixel timing generator circuit 106, thus updating a respective bin of the histogram based on a detected photon. A number of bins is defined based on the first and second frequencies. The exact number of histogram bins implemented in a given imaging IC 100 is determined by the following: the desired TOF range (which represents real-world physical range to target) drives the overall depth of the histogram. Second, the desired TOF resolution determines the size of the aperture. Finally, the number of laser shots, acceptable frequencies to operate the imaging IC 100 at are both optimization parameters that determine the period of frequency of the pulses emitted by the pixel timing generator 106 and the number of divisions within that period that determine the number of time offsets to consider. There is no specific rule for favoring one versus the other. As an illustrative example of design optimization of imaging IC 100, assume the desired range is 70 meters and the desired range resolution is 2 cm. Further assume that in as much as an advantage of the invention is recreating the return laser pulse shape, a matched filter could relax the per-virtual-bin capture resolution to 4*resolution, so 4*2 cm in this example equals to 8 cm. Then, then the "virtual" number of histogram bins is 70 m/0.08 m=875. The lapse time that the histogram represents is also called the "gate" time and relates to range as (70 m/1.5e8 m/s)=470 ns. (1.5e8 m/s is ½ of the speed of light and accounts for outbound and return of the light reflected from a target.) If the desired SPAD enable and Latch enable frequency is 100 MHz (for reasons of optimization), then the number of coarse level bins is the gate time*latch enable frequency=(470 ns)*(100e6 Hz)=47 bins. The number of offsets per coarse level bin would then be the virtual bins divided by the coarse level bins=875 virtual bins/47 bins=19 offsets. In real-world practice, 19 offsets is close to perfect-power-of-2 number 16, and thus, a practical design would consider 16 offsets and then increase the SPAD enable/latch enable frequency to approximately 120 MHz (assuming this was possible). Also then, when adjusting the SPAD enable frequency, the number of coarse level bins would increase to 57. So, in this illustrative example, 57 histogram bins would be required and the number of explored offsets would be 16 and the SPAD enable frequency would be 120 MHz. Also, note that if there were 32 laser shots per offset, then the maximum bit width of the 57 histogram bins would be 5 bits ($2^5$=32). The total required laser shots would be 32 laser shots per offset*16 offsets=512 total laser shots. Also note that a prior art histogram without the invention would require a histogram to have 9 bits (corresponding to 512 laser shots, i.e. $2^9$=512). The size of memory size created by the invention is (57*5)/(512*9)=6.1% of the size of the prior art memory. In other words, the invention has shrunk hardware memory requirements on imaging IC 100 by 16×.

In an embodiment, the pixel timing generator circuit 106 sets the phase of the sequence of timing pulses to a specific value for a specific number of laser enable pulses. After the specific number of laser enable pulses, the pixel timing generator 106 allows a video timing generator circuit 112 to send video timing to the readout circuit of pixels 104, allowing the readout circuits 111 to read data out of the histogram memory circuit 110. The histogram memory circuit 110 zeros (resets) bin values during readout. After video readout, the pixel timing generator circuit 106 can change the phase of the sequence of timing pulses. The pixel timing generator circuit 106 can modify the phases of the sequence of timing pulses by an algorithm that relates to allowing each fractional interval of the period of the sequence of timing pulses to be sensitive to SPAD subcircuit 108 pulse events.

Figure 11:
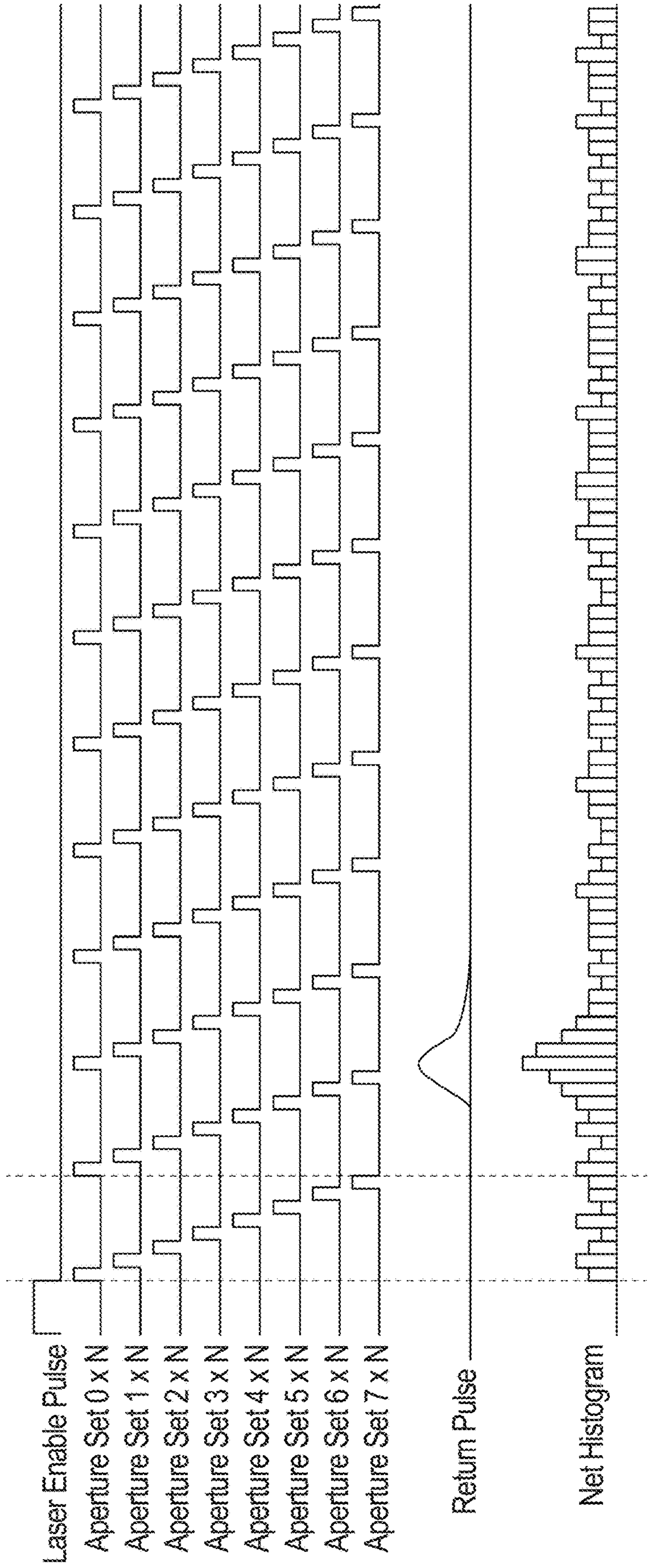
FIG. 11 shows an example graph of timing pulses with multiple Phase Offsets.

FIG. 11 shows how the algorithm that varies the phase offsets can be used to synthesize or create a detailed histogram having higher bin resolution than the coarse histogram. In fact, the relationship is that if the fraction of the period of the apertures is 1/M of the period of the sequence of timing pulses, then the Net Histogram is M times larger than the coarse histogram. This relationship produces advantages, most specifically that the coarse histogram physical memory is at least M times smaller than the final histogram it produces. In many cases, the size of physical memory relates to area feasibility and power dissipation on the imaging IC 100. In some cases, it is desirable for the histogram memory circuit 110 to be imbedded in the pixel 104, and these cases, the smaller physical memory implementation of the invention is an advantage. In one example, a matched filter may be applied to the final detailed histogram data, and the distance to an object may be detected based on an identified maximum of the histogram data. In the present context, a matched filter is realized by correlating a weighted set of coefficients representing the laser impulse signal, in a correlation filter against the count values of the histogram. In addition, higher resolution is possible by having a plurality of weighted filter coefficients representing interior (or higher resolution) presentations of the laser impulse signal interpolated at a higher resolution than the histogram timebase. Thus, in the example where the resolution of the histogram was set to 4 times the desired resolution, a matched filter would comprise a set of 4 weighted coefficient sets, representing interior time points of higher resolution than the histogram.

Timing generator circuit 106 can have multiple embodiments. In one embodiment, there can be one timing generator circuit 106 for each row of an array of pixels such that all pixels of a given row respond to signals by a specific instance of a timing generator 106. Similarly, timing generator 106 instances could also be associated with columns instead of rows, and such an embodiment, each pixel of a column would respond to specific instances of timing generator 106. Timing generator circuits 106 could be associated with multiple rows or multiple columns of pixels. For instance, timing generator circuits 106 could be associated with pairs of rows or 4 rows, and so forth.

When timing generator circuits 106 are associated with rows or columns, the offsets used by the timing generator circuits 106 can be different than one another for a given activation of a laser. Thus, for example, timing generator circuits 106 of rows {0, 8, 16, 24, . . . } could use an offset time of 0 for a given laser flash, while timing generator circuits 106 of rows {1, 9, 17, 25, . . . } could use one unit offset and timing generator circuits 106 of rows {2, 10, 18, 26, . . . } could use two unit offsets, and so on.

In the previous illustrative example, the design point established 120 MHz as the SPAR enable frequency and 16 offsets per period of that waveform. In such a case as this, each unit offset would be 1/(16*120e6)=520 psec. So, in this manner, timing apertures created by timing generators 106, one-per-row, could create row-based acquisitions separated by 520 psec, relative to laser enable.

The primary advantages of creating row-based timing are two-fold. First, since there are logic gates in pixel 104, switching events of these gates create supply transients caused by switching current against non-trivial supply impedance. When timing generator circuits 106 are out of phase, [the] they "spread out" the switching transients on the supply wires and cause the supply transient deflections (a.k.a. "supply noise") to be "flatter"—overall lower in amplitude. Keeping the digital supply lines quieter leads to improved immunity of SPAD circuits to coupled noise (which in turn could increase dark counts due to digital supply line induced events). A second advantage of implementing different offsets per row relates to potentially shared resources. For example, some aspects of the pixel 104 blocks (for example, parts of the histogram) might be shared between pixels, perhaps across row boundaries. When the timing generator circuits 106 implement offset timing, then interleaved timing is created that could allow for some resources or parts of resources to be shared (physically, logically, or electrically) between pixels. This in turn could create other implementation advantages related to pixel density, etc.

Some elements within pixel 104 can be shared. For example, it's possible for a single histogram circuit which could comprise SRAM elements, could be shared between multiple pixels. In some embodiments, sharing circuits such as the histogram circuit, could enable higher pixel densities due to overhead area associated with such circuits. Thus, some aspects of pixel 104 could be virtualized and physically located either within or outside of the physical pixel area on a given ROIC.

Based on the disclosed embodiments, by electrically controlling the enablement of the SPAD subcircuit 108, it is possible to correctly measure the return energy of the reflected laser pulse in time domain.

In an embodiment, the histogram memory circuit 110 has two banks of memory, allowing it to acquire data and transmit data simultaneously. In this embodiment, the laser enable circuit 114 and pixel 104 timing generator circuit 106 may not need to pause for the actions of the Video timing generator circuit 112.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising:

actuating a laser diode to emit a first series of laser pulses in a first frequency;

enabling a single-photon-avalanche diode (SPAD) in a pixel of a focal-plane array to detect a photon during a first series of enable times defined by a first series of enable pulses in a second frequency greater than the first frequency; and updating a histogram memory based on a photon detected during the first series of enable times;

wherein a pixel timing generator circuit at the array receives the laser pulses and establishes a time-0 reference for each pulse such that the timing of the photon being detected by the SPAD is fixed with reference to the time-0 reference associated with the laser pulse that originated the photon;

actuating the laser diode to emit a second series of laser pulses in the first frequency;

at a first time offset, enabling the SPAD to detect a photon during a second series of enable times defined by a second series of enable pulses in the second frequency;

updating the histogram memory based on a photon detected during the second series of enable times;

detecting a distance to an object based on a second histogram;

applying a matched filter to second histogram data, wherein the matched filter is realized by correlating a weighted set of coefficients representing a laser impulse signal in a correlation filter against a plurality of count values of the second histogram; and detecting the distance to the object based on an identified maximum of the second histogram data.

2. The method of claim 1, further comprising:

actuating the laser diode to emit a third series of laser pulses in the first frequency; and at a second time offset, enabling the SPAD to detect a photon during a third series of enable times defined by a third series of enable pulses in the second frequency.

3. The method of claim 2, wherein the second series of enable pulses and the third series of enable pulses are non-overlapping.

4. The method of claim 1, further comprising:
determining a plurality of time offsets; and
at each of the plurality of time offsets, enabling the SPAD to detect a photon during a second series of enable times defined by a second series of enable pulses in the second frequency, wherein the plurality of second series of enable pulses covers a clock period of the first series of laser pulses.

5. The method of claim 1, further comprising updating a respective bin of a first histogram based on a detected photon, wherein a number of bins is defined based on the first and second frequencies.

6. The method of claim 5, further comprising
actuating the laser diode to emit a third series of laser pulses in the first frequency;
at the first time offset, enabling the SPAD to detect a photon during a third series of enable times defined by a third series of enable pulses in the second frequency; and
updating a first histogram memory based on a photon detected during the third series of enable times.

7. A control system of a lidar unit comprising instructions executable to:
actuate a laser diode at a time-0 base time to emit a first series of laser pulses in a first frequency;
enable a single-photon-avalanche diode (SPAD) in a pixel of a focal-plane array to detect a photon during a first series of enable times defined by a first series of enable pulses in a second frequency greater than the first frequency; and
update a histogram memory based on a photon detected during the first series of enable times;
wherein a pixel timing generator circuit at the array receives the laser pulses and establishes a time-0 reference for each pulse such that the timing of the photon being detected by the SPAD is fixed with reference to the time-0 reference associated with the laser pulse that originated the photon;
actuate the laser diode to emit a second series of laser pulses in the first frequency;
at a first time offset, enable the SPAD to detect a photon during a second series of enable times defined by a second series of enable pulses in the second frequency;
update the histogram memory based on a photon detected during the second series of enable times;
detect a distance to an object based on a second histogram;
apply a matched filter to second histogram data, wherein the matched filter is realized by correlating a weighted set of coefficients representing a laser impulse signal in a correlation filter against a plurality of count values of the second histogram; and
detect the distance to the object based on an identified maximum of the second histogram data.

8. The control system of claim 7, wherein the instructions further include instructions to:
actuate the laser diode to emit a third series of laser pulses in the first frequency; and
at a second time offset, enable the SPAD to detect a photon during a third series of enable times defined by a third series of enable pulses in the second frequency.

9. The control system of claim 8, wherein the second series of enable pulses and the third series of enable pulses are non-overlapping.

10. The control system of claim 7, wherein the instructions further include instructions to:
determine a plurality of time offsets; and
at each of the plurality of time offsets, enable the SPAD to detect a photon during a second series of enable times defined by a second series of enable pulses in the second frequency, wherein the plurality of second series of enable pulses covers a clock period of the first series of laser pulses.

11. The control system of claim 7, wherein the instructions further include instructions to update a respective bin of the histogram based on a detected photon, wherein a number of bins is defined based on the first and second frequencies.

12. The control system of claim 11, wherein the instructions further include instructions to:
actuate the laser diode to emit a third series of laser pulses in the first frequency;
at the first time offset, enable the SPAD to detect a photon during a third series of enable times defined by a third series of enable pulses in the second frequency; and
update the histogram memory based on a photon detected during the third series of enable times.

* * * * *